Figure 7:
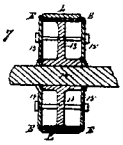
Figure 6:
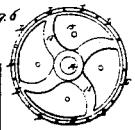
Figure 5:
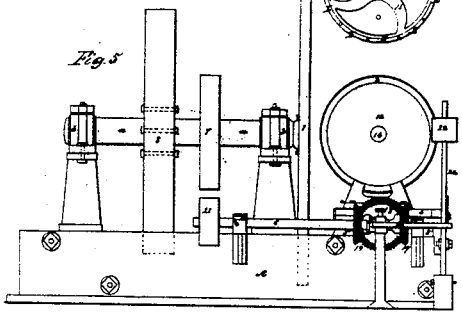
Figure 4:
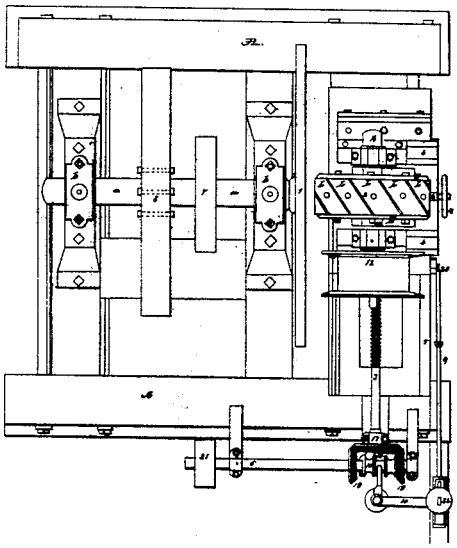

51/45
2 Sheets-Sheet 1.
R. M. Hoe.
Grinding Saw Plates.
Re No. 462. Reissued May 5, 1857.
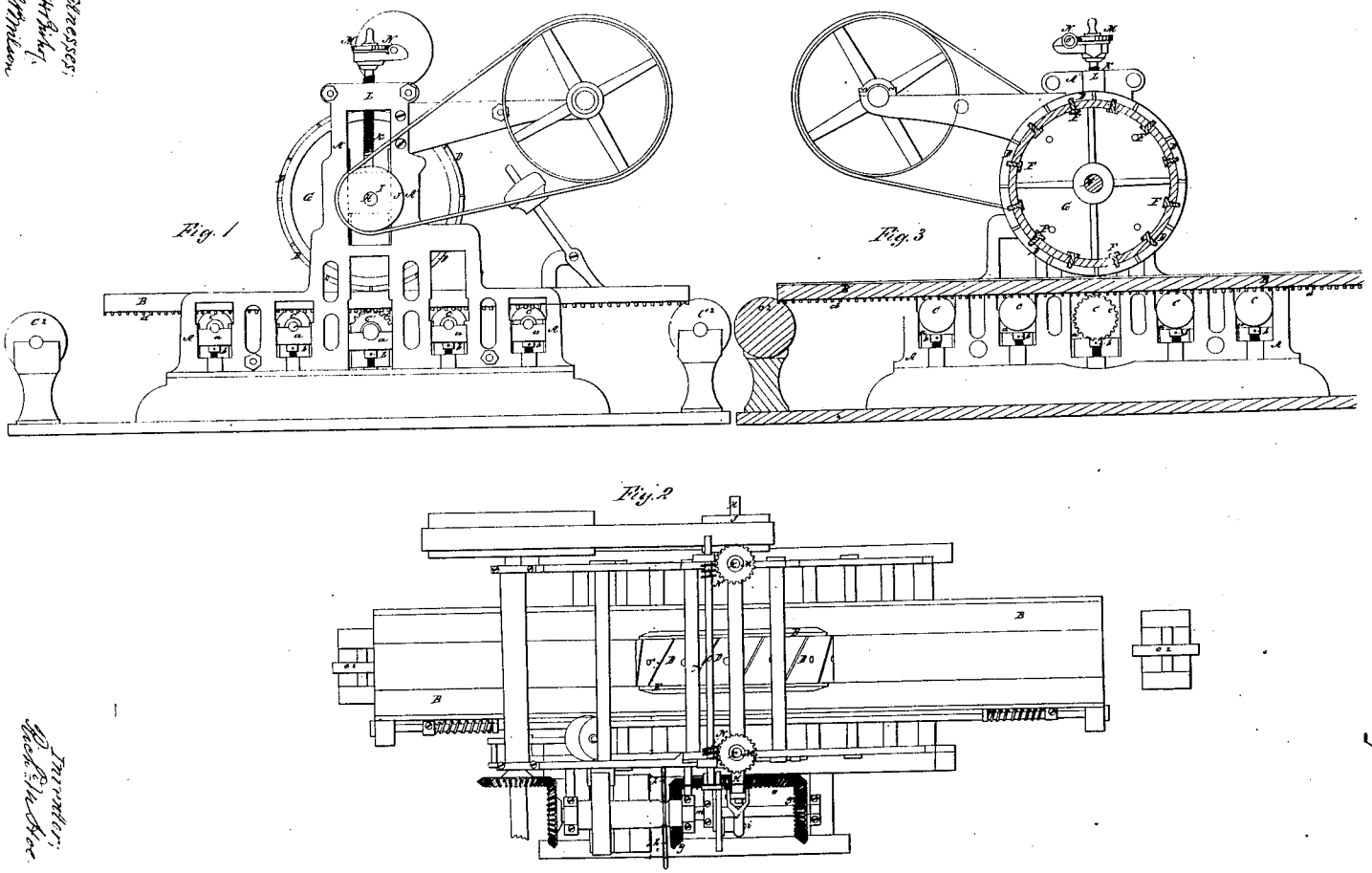
Witnesses;
Wm H Baker
Geo H Wilson
Inventor;
Richd M Hoe

PAT. ABRADING
45

2 Sheets—Sheet 2.

R. M. Hoe.

Grinding Saw Plates.

No. 462.

Reissued May 5, 1857.

Witnesses;
Wm. H. Bishop
Joel Wilson

Inventor;
Richd. M. Hoe

N. PETERS, PHOTO-LITHOGRAPHER, WASHINGTON, D. C.

UNITED STATES PATENT OFFICE.

RICHARD M. HOE, OF NEW YORK, N. Y.

IMPROVEMENT IN MACHINERY FOR GRINDING AND POLISHING METALLIC SURFACES, PARTICULARLY SAW-PLATES.

Specification forming part of Letters Patent No. 2,656, dated May 30, 1842; extended 7 years from May 30, 1856; Reissue No. 462, dated May 5, 1857.

*To all whom it may concern:*

Be it known that I, RICHARD M. HOE, civil engineer and machinist, of the city of New York, and State of New York, have invented certain new and useful improvements in machinery for grinding and polishing metallic surfaces or plates, and which is applicable in an especial manner to the grinding and polishing of saw-plates so as to give them an even surface and an equal thickness, said machine being so modified as to adapt it to those plates which are circular as well as those which are straight; and I do hereby declare that the following is a full and exact description thereof.

When my machine is intended for the grinding and polishing plates of metal for long saws—such as mill, cross-cut, or others—or for long surfaces, or plates of metal, for other purposes, I prepare a table, or bed of metal, sufficiently long and wide to sustain the largest plates or pieces upon which it is intended that the machine shall operate. This bed or table is to be made perfectly true on its upper surface by planing, grinding, or otherwise, and it is to be supported upon rollers which have gudgeons that run in suitable boxes on each side of the frame-work of the machine, and are made adjustable by means of set-screws. The bed or table is to have a traversing motion from end to end, which may be given to it by any of those mechanical devices which are used for such a purpose. It may, for example, be obtained by means of a revolving screw operating in the manner of that frequently used for carrying the slide-rest of a lathe back and forth; or it may be effected by extending a rack or racks along the under side of the table and placing upon the axis of one or more of the rollers upon which the table rests, or upon a separate axis, a toothed wheel or wheels gearing into such rack or racks, such geared axis, roller, or rollers having motion communicated to them by means of suitable gearing or bands connected with the general motive power employed, the parts being so arranged as that the motion of the table shall be reversed at the proper instant, and that it shall be kept traversing back and forth during the whole time that the machine is in operation. Above this table there is to be a grinding or polishing drum, or cylindrical lap, to which a continuous revolving motion is to be given, the outer diameter or periphery of such drum or lap being its grinding or polishing surface. The shaft of this cylindrical grinding or polishing lap turns in suitable bearings, which are to be furnished with strong screw or other adjustments by means of which the position of the cylindrical lap, or its distance from the table, may be regulated at pleasure to suit plates of different thicknesses or to determine the force with which the lap shall bear upon the plate to be ground or polished. The revolving lap is to have, also, a horizontal traversing motion from side to side of the machine for the purpose of shifting continually the points of contact between the lap and the plate, thereby preventing the undue wearing of either in any particular part, and preserving a true cylindrical surface on the lap and perfect flatness on the plate. This traversing motion may be given to the shaft of the lap by means of a revolving oscillating crank and a connecting-rod, or by means of a grooved snail or cam-wheel acting upon the end of the shaft, or in any other of the modes of effecting this object which are well known to machinists.

When the machine is to be used for the grinding and polishing of circular plates a shaft-mandrel, like the mandrel of a lathe, is to be made to revolve in suitable collars or on centers, and this mandrel is to carry a circular disk or flat plate like the face-plate or chuck of a lathe, such plate being furnished with suitable means for holding in place the saw or other plate to be ground or polished. The chuck or face plate may be made to revolve either vertically or horizontally, but I prefer the former position, and have so represented it in the accompanying drawings. A grinding and polishing drum or cylindrical lap, similar in all respects to that used for straight saws, is to be mounted on a suitable head in front of the revolving plate, which head may rest on a double V, or other suitably shaped bed, along which it may be guided like the slide-rest of a lathe. The head which carries the grinding or polishing lap is to have a traversing-motion given to it by means of a screw, a rack, and pinion, or other device, so that the lap may be made to pass back and forth across the face of the plate to and from its periphery and center. The revolving lap is made adjustable, so that its distance from and the force with which it may be made to bear upon the plate to be ground may be regulated.

Another part of my invention consists in the manner of constructing the cylindrical grinding and polishing drum or lap. Those which have been hitherto made with grinding and polishing faces of metal have been formed either of a solid mass, or the cylindrical face or surface has consisted of a continuous rim or hoop of metal, and these laps frequently become untrue from expansion, are with difficulty renewed and kept in order, and are attended with other inconveniences. My improved lap has its face or grinding and polishing surface formed of a number of separate plates of metal—say of half an inch, more or less, in thickness—which plates are to be placed around the face of a metallic hub which has a projecting rim on each side, between which the edges of the plates are to be clipped, one or more screws or bolts also passing through each plate, whereby they are securely fastened to the hub. The plates so arranged and affixed will not be disturbed by expansion and contraction, or from any other cause, while they are readily renewed and easily kept in perfect order. The line of junction between these plates I prefer to make pass obliquely across the face of the lap.

In the accompanying drawings, Figure 1 is a side elevation of the machine as constructed for the grinding and polishing of straight saws. Fig. 2 is a plan or top view of the same, and Fig. 3 a vertical section taken longitudially through its center.

A A′ is a strong frame-work and standards of cast-iron, securely fixed on a foundation or ground-work, and properly connected together by cross-bolts and braces.

B is the traversing horizontal table or bed resting upon and supported by several rollers, C C C, the axes of which turn in bearings or brasses *a a*, placed between grooves or guides in the frame-work. These bearings are supported upon adjusting-screws *b b* on each side of the machine. The table may by means of these be placed a little out of the horizontal, transversely, or at an angle with the axis of the grinding-lap, whenever it is desired to grind plates a little thicker on one edge than the other, which should be done on all long saw-blades. The middle roller, C′, may carry toothed wheels or pinions *c*, which may take into racks *d* on the under side of the table and give it the desired traversing motion. The roller C′ may receive its alternate rotary motion from the beveled-wheel *e*, which is driven in the reverse directions alternately by the wheels *g g*, these being actuated by clutches, or engaging and disengaging apparatus in any of the ways known to machinists, and which is not necessary to describe, as I do not intend to limit myself to any particular manner of effecting this object. In my first essays I employed pressing-rollers to bear upon the upper surfaces of saws to be ground and polished, but I have found in practice that check-pins or other devices of the most simple character are sufficient for this purpose, the plates having but little tendency to rise up from the table.

$C^2$ are pulleys upon stands to support the table.

G is the main body of the cylindrical drum or lap, by which the grinding and polishing are effected.

D D D are metallic segments which surround the face of the hub E E, being ledges on each side of the hub, between which the segment-pieces are embraced.

F F are screws by which the segment-pieces are fastened to a hoop or rim making a part of the hub. These cylindrical laps are to be supplied with emery, or with any other grinding or polishing powder, or other substance, mixed with oil, water, or other fluid, according to the nature of the work to be performed. The metallic segments may be composed of various metals or alloys, adapted to the material which is to be spread upon them and to the effect they are intended to produce.

The cylindrical lap is mounted upon a shaft or axis, H, passing through carrier-bearings I, (shown by dotted lines in Fig. 1,) placed between guides in the grooves of the standards A′. Upon one end of the shaft H is fixed a driving-pulley or rigger, J, which may receive its rotary motion from a drum or pulley on the shaft of the first mover. The motion of the lap should be very rapid—say about three hundred revolutions in a minute—and its shaft may be supplied with different-sized pulleys or riggers to give different velocities thereto. The manner of adjusting the lap so as to bear with the proper degree of force upon the bed may be varied. That represented in the drawings is convenient and effective. In this the bearings I are connected by collars and stirrup-pieces to the screws K K, which pass through the female screws at L L, fixed in the cross-heads of the standards A′.

In order to turn the screws K K simultaneously they are each furnished with a screw-wheel, M M, into which are geared the two endless screws N N, placed on the shaft O, turning in bearings on brackets on the tops of the screws K. The shaft O may be turned by means of a winch or otherwise, and the lap will be thereby raised or lowered.

The traversing motion of the shaft H carrying the cylindrical lap may be effected by the following means: A shaft, *m*, may be made to revolve by means of a band and pulley, *h*, or in any other convenient way. This shaft carries an adjustable crank-pin, *i*, connected to the shaft of the lap by means of a connecting-rod, *j*, and the lap may thus be gradually and progressively moved across the bed by the machine, and the position of the actual grinding-surface be thereby constantly shifted

United States Patent Office

PTO - BOYERS, PA Duty Station

MISSING PAGE TEMPORARY NOTICE

PATENT # Re 462 FOR ISSUE DATE 5-5-1857

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE

P.3 of Text + list.

N/A at Boyers 11-3-92.

Data Conversion Operation

Boyers, Pa